United States Patent [19]

Shobuzako et al.

[11] Patent Number: 5,144,979
[45] Date of Patent: Sep. 8, 1992

[54] TUBE COUPLER AND A VALVE FOR A TUBE COUPLER

[75] Inventors: Masaru Shobuzako; Yoshikazu Ozaki, both of Tokyo, Japan

[73] Assignee: Nitto Kohki Co., Ltd., Tokyo, Japan

[21] Appl. No.: 652,774

[22] Filed: Feb. 8, 1991

[30] Foreign Application Priority Data

Feb. 19, 1990 [JP] Japan .................. 2-14804[U]

[51] Int. Cl.$^5$ .............................................. F16L 37/28
[52] U.S. Cl. ........................... 137/614.04; 137/614.02
[58] Field of Search ............... 137/614.03, 614.04, 137/614.05, 614, 614.01, 614.02; 251/89.5, 149.9, 901; 81/177.1, 177.5

[56] References Cited

U.S. PATENT DOCUMENTS

| 2,351,232 | 6/1944 | Schnabolk | 81/177.5 X |
| 2,461,700 | 2/1949 | Scheiwer | 137/614.03 |
| 2,504,569 | 4/1950 | Murphy et al. | 137/614.04 X |
| 3,216,471 | 11/1965 | Wendel | 81/177.5 |
| 3,525,361 | 8/1970 | Cerbin | 137/614.04 |
| 3,738,768 | 6/1973 | Kuhn | 81/177.5 X |

FOREIGN PATENT DOCUMENTS

| 121968 | 8/1946 | Australia | 137/614.04 |
| 1272472 | 4/1958 | France | 137/614.03 |
| 110392 | of 1957 | Japan | 137/614.04 |
| 60-5184 | 7/1985 | Japan . | |
| 865002 | 4/1961 | United Kingdom | 137/614.04 |

Primary Examiner—Martin P. Schwadron
Assistant Examiner—Kevin L. Lee
Attorney, Agent, or Firm—Nixon & Vanderhye

[57] ABSTRACT

A tube coupler of this invention, is provided with a plug and a socket each having a fluid passage and a valve. When the plug and the socket are connected together, they push each other to cause the fluid passage of the plug to communicate with the fluid passage of the socket. The socket has a main socket tube body comprising an inner tube and an outer tube provided separately and threadably engaging each other. The plug has a main plug tube body insertable between the inner and outer tubes. The tube coupler has a seal member mounted on the outer peripheral surface of the inner tube of the main socket tube body for sealing a gap between the outer peripheral surface of the main socket tube body and the inner peripheral face of the main plug tube body.

4 Claims, 4 Drawing Sheets

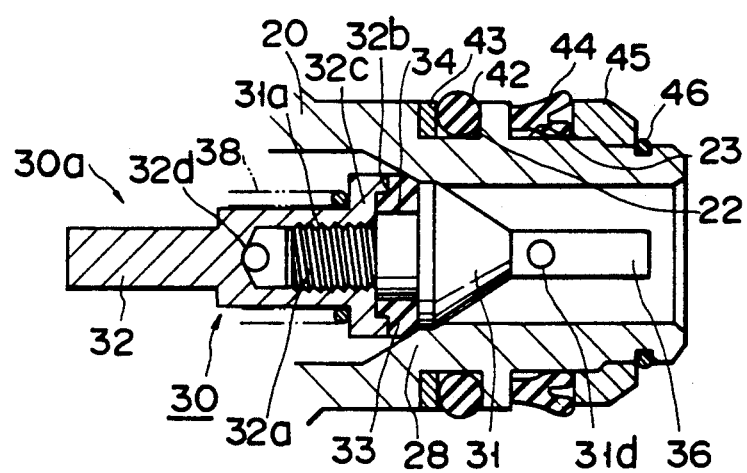
F I G. 4

TUBE COUPLER AND A VALVE FOR A TUBE COUPLER

BACKGROUND OF THE INVENTION

1. Field of the Invention

This invention relates to a tube coupler of a type for sealing the inner peripheral face of a plug and a valve used for such a tube coupler.

2. Description of the Related Art

The tube couplers of the type are well known which seals the outer peripheral surface of a plug when the plug is connected to a socket. In the tube coupler of this type, the outer peripheral surface of the plug which constitutes a surface to be sealed is liable to be scratched. Japanese Laid-open Utility Model Application Sho 57-110392 discloses a tube coupler in which the inner peripheral face of a plug is made as a face to be sealed, thereby protecting the sealed portion.

In a valve used for closing a fluid passage, the valve head portion and a valve rod portion or a valve tube portion are formed integral with each other, and an O-ring or another seal ring is fitted in an annular groove formed in the valve head portion.

However, the provision of a face to be sealed on the inner peripheral face of the plug, as described above, renders the structure of the socket complicated, thereby increasing the manufacturing cost. On the other hand, in the conventional tube coupler which seals the outer surface of the plug, a groove for receiving a seal ring must be formed in the outer peripheral surface of the plug. The formation of this groove in the plug enhances the machining cost of the plug. Since much more plugs are used than sockets in the field where tube couplers are used, it is uneconomical to used many such plugs. In this respect, it is desired that tube couplers be of an inner-peripheral face sealing type and that both sockets and plugs are manufactured at a low cost.

The width of the above-mentioned annular groove formed in the valve head portion for receiving the O-ring is determined by the dimension of the O-ring provided on the valve. If it happens that the width of the groove becomes wider than that of the O-ring, a perfect sealing effect cannot be expected. Alternatively, if a ring which is not easily deformed, it cannot be fitted in the annular groove in an extended state.

SUMMARY OF THE INVENTION

The first object of this invention is to provide a tube coupler which is of a type for sealing the inner peripheral face of a plug and which is manufactured at a low cost.

The second object of this invention is to provide a valve which is preferable as a sealing member of the fluid passage of a general tube coupler.

The first object of this invention is attained by a tube coupler which comprises a plug and a socket each having a fluid passage and a valve. When the plug is connected to the socket, their valves push each other and are retracted so that the fluid passage of the plug communicates with that of the socket. The socket has a main socket body comprising an inner tube and an outer tube separately provided and threadably engaging each other. The plug has a main plug tube body insertable between the inner tube and the outer tube. The tube coupler further comprises a seal member provided on the outer peripheral surface of the inner tube of the main socket tube body, for sealing the gap between the outer peripheral surface of the inner tube of the main socket tube body and the inner peripheral face of the main plug tube body.

The second object of this invention is attained by a valve for a tube coupler which comprises a main valve body having a valve head portion and a valve rod portion separately provided from each other and used for closing the fluid passages of a tube coupler having a plug and a socket, and a seal ring firmly sandwiched between the valve head portion and the valve rod portion which threadably engage each other.

As the main plug tube body is being inserted into the main socket tube body in the tube coupler according to this invention, the main plug tube body and the main socket tube body are sealed by means of sealing means, and thereafter the plug is completely connected to the socket. In this state, the inner peripheral face of the main plug tube body is sealed, and the valve of the socket and the plug push each other during the connecting process, thereby to open their fluid passages.

In the valve according to this invention, before connecting the valve head portion to the valve rod portion, the seal ring is inserted between them so that it is sandwiched between them in a normal state by the threadably engaging force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is an enlarged cross-sectional view of a valve of the embodiment according to this invention.

DETAILED DESCRIPTION OF THE PREFERRED EMBODIMENT

A preferred embodiment of a tube coupler according to this invention will now be explained with reference to the drawings.

Figure 1B:
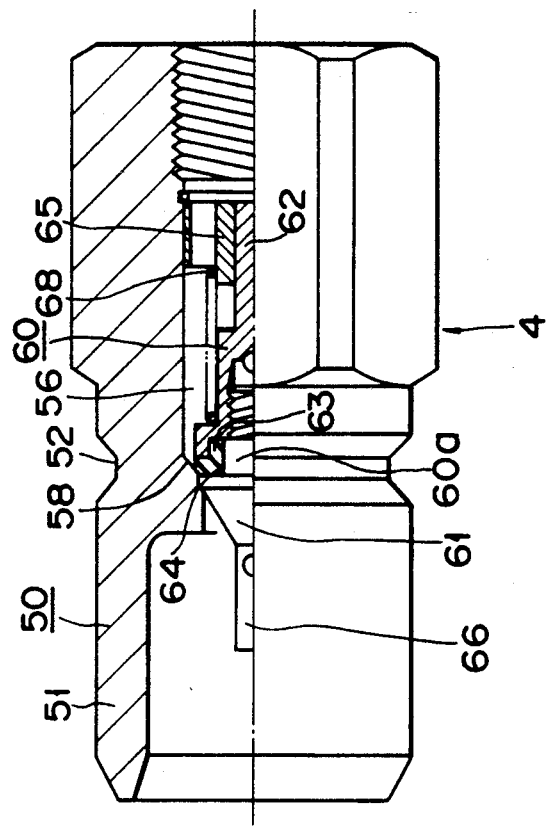
FIG. 1B is a partially cross-sectional view of a plug according to the embodiment of this invention.
Figure 1A:
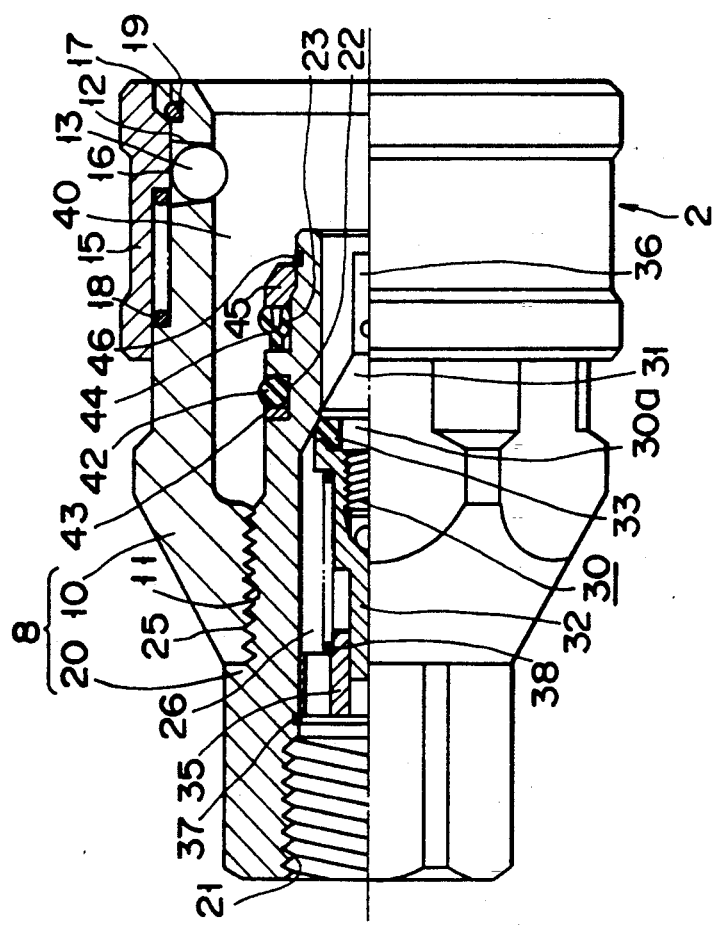
FIG. 1A is a partially cross-sectional view of a socket according to one embodiment of this invention.

FIG. 1A and FIG. 1B are partially cross-sectional views of socket 2 and a plug 4 of a tube coupler according to this invention, respectively.

The socket 2 has a main tube body 8 comprising an inner tube 20 provided with a threadable connection portion 21 connected to a pipe and an outer tube 10 threadably coaxially mounted on the inner tube 20. Between the inner tube 20 and the outer tube 10 is formed an annular space 40 having an axial gap corresponding to the thickness of a main plug body 50 so that the space 40 receives the plug 4.

A female screw 11 is formed in the inner peripheral face of the rear end portion of the outer tube 10 and engages a male screws 25 formed in the substantially central portion of the outer peripheral surface of the inner tube 20.

In the front portion of the outer tube 10 of the socket 2 are formed a plurality of tapered holes 12 which are arranged circumferentially of the front portion of the outer tube 10 and are tapered so that their inner diameter is slightly smaller than their outer diameter. In each tapered hole 12 is loosely fitted a lock ball 13 which constitutes a part of a well known ball lock mechanism and has a diameter larger than the inner diameter of the tapered hole 12 but smaller than the outer diameter thereof.

On the outer peripheral surface of the front portion of the outer tube 10 is slidably fitted a sleeve 15 having a ball retaining portion 16 provided on its inner peripheral face for limiting the radially outward movement of the lock ball 13 and a ball releasing portion 17 formed in the inner peripheral face of the front portion of the sleeve 15 for releasing the lock balls 13. The sleeve 15 is normally urged forward by means of a sleeve spring 18. A stop ring for preventing the sleeve 15 from coming off is designated by the referential numeral 19.

In the outer peripheral surface of the front portion of the inner tube 20 are formed an annular groove 22 for receiving an O-ring 42, and another annular groove 23 for receiving a Y-shaped packing 44. The O-ring 42 and the Y-shaped packing 44 as seal means are attached to the annular grooves 22 and 23 respectively. A backup ring 43 is used for pressingly supporting the O-ring 42, and a ring 45 is used for supporting the Y-shaped packing 44. The Y-shaped packing 44 is made of fluororesin which is hard to be deformed and is held at its open end by means of the ring 45. A stop ring is shown by the referential numeral 46.

In a fluid passage 26 extending axially through the inner tube 20 is provided a valve 30 for closing the fluid passage 26. As shown in an enlarged cross section in FIG. 4, the valve 30 has a main valve body 30a comprising a valve head portion 31 and a valve rod portion 32 provided separately from each other. A male screw 31a projecting rearward from the valve head portion 31 engages a female screw 32a formed in the front portion of the valve rod portion 32. A groove 34 for receiving a seal ring 33 is formed in the central portion of the valve head portion 31 and has an outer diameter slightly smaller than that of the valve head portion 31. On the front end of the valve rod portion 32 are formed an engaging portion 32b for preventing the seal ring 33 from slipping off and a pressing face portion 32c for pressing the seal ring 33. The outer diameters of the engaging portion 32b and the pressing face portion 32c are substantially equal to that of the valve head portion 31.

As shown in FIG. 1A, the main valve body 30a is supported by means of an annular valve holder 35 which is prevented from slipping off by means of a stop ring 37. A valve spring 38 normally urges the main valve body 30a forward. A valve pushing rod 36 projects forward from the valve head 31.

Through holes 31d and 32d are provided in the valve head portion 31 and the valve rod portion 32 as shown in FIG. 4, respectively. Rods are inserted in them so that they are easily rotated when they are caused to engage each other.

In the plug 4 as shown in FIG. 1B, the front portion 51 of the main plug tube body 50 which is to be inserted in the annular space 40 of the socket 2 has smooth inner and outer faces. An annular groove 52 engaging the lock ball 13 is formed in the outer peripheral surface of the central portion of the main plug tube body 50.

A valve 60 having the same structure as the valve 30 is supported by means of a valve holder 65 and is normally urged by means of a valve spring 68 within the main plug tube body 50 in the same manner as the socket 2. Similarly to the valve 30, a valve head 61 is provided with a valve pushing rod 66. After the inner peripheral face of the plug 4 has been sealed by means of the O-ring 42 and the Y-shaped packing 44 upon connecting the plug 4 to the socket 2, the valve pushing rods 66 and 36 of the valves 60 and 30 of the plug 4 and the socket 2 push each other and are retracted, whereby the fluid passages 26 and 56 of the socket 2 and the plug 4 open.

The operation of this embodiment will now be explained.

First, the sleeve 15 of the socket 2 is retracted against the biasing force of the sleeve spring 18. The lock balls 13 are released from the radially inward pressure by the ball retaining portion 16 and enter the ball releasing portion 17 to be made free.

Figure 2:
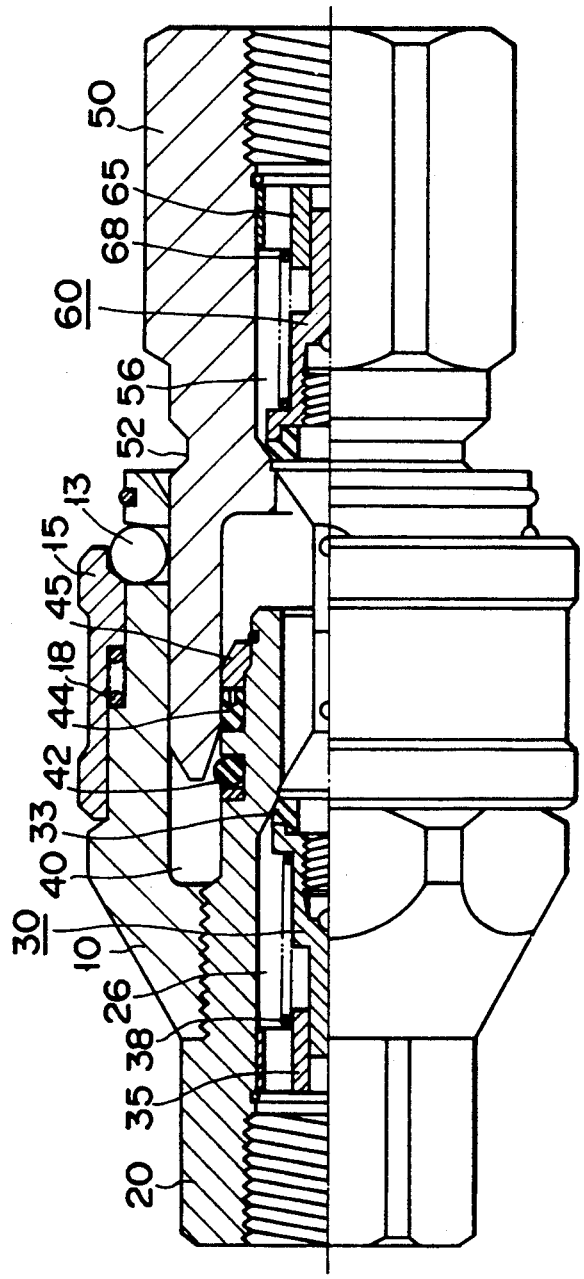
FIG. 2 is a partially cross-sectional view of a tube coupler according to this invention before the connection is made.

Next, the plug 4 is fitted in the socket 2. As the front end portion of the main plug tube body 50 is inserted in the annular space 40 formed between the inner tube 20 and the outer tube 10 as shown in FIG. 2, the outer peripheral surface of the main plug tube body 50 slides on the inner peripheral face of the outer tube 10 of the socket 2, and the inner peripheral face of the main plug tube body 50 contacts the Y-shaped packing 4 and the O-ring 42 and advances in the annular space 40. When the inner peripheral face of the main plug tube body 50 is sealed, the front ends of the main valve body 30a and the main valve body 60a are in an abutted state.

Figure 3:
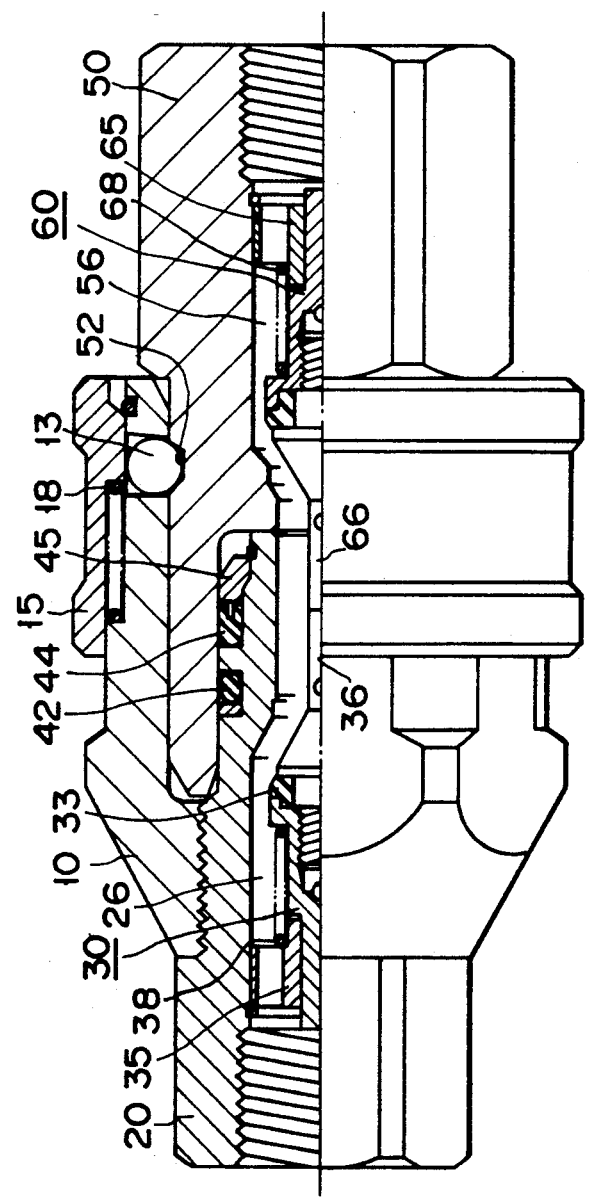
FIG. 3 is a partially cross-sectional view of the tub coupler after the perfect connection has been made.

In the next step, the main plug tube body 50 is further pushed in. As shown in FIG. 3, the lock balls 13 engages the annular groove 52 of the main plug tube body 50, and the sleeve 15 is returned to the original position by means the biasing force of the sleeve spring 18. The ball retaining portion 16 presses the lock balls 13 radially inward and locks them. As a result, the plug 4 is fully connected to the socket 2. Further, the valve pushing rod 36 of the main valve body 30a of the socket 2 and the valve pushing rod 66 of the main valve body 60a of the plug 4 push each other so that they are retracted against the biasing force of the valve springs 38 and 68 to open the fluid passages 26 and 56. In this way, the inner peripheral face of the main plug tube body 50 is completely sealed by means of the Y-shaped packing 44 and the O-ring 42.

Since the valve head portions 31, 61 and the corresponding valve rod portions 32, 62 of the main valve bodies 30a and 60a are separately provided and threadably engage each other, the adjustment of the degree of the engagement between the valve head portions and the valve rod portions allows for increasing or reducing the pressed force applied to the seal rings 33 and 63, maintaining the abutting state of the seal rings 33 and 63 against valve seats 28 and 58 formed in the fluid passages 26 and 56 in an optimum condition.

When the seal rings 33, 63 which are not easily deformable such as conventional rubber O-rings are used, the valve rod portions 32, 62 may be tightened after the seal rings 33, 63 have previously been fitted in the grooves 34, 64 of the valve head portions 31, 61. Each arrangement facilitates the fitting of the seal ring made of fluororesin which is not easily deformed in the groove of the valve head portion.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A tube coupler comprising:

a socket having a fluid passage, a first valve assembly and a main socket tube body comprising an inner tube and an outer tube separately provided and threadably engaging each other, said inner tube having an outer peripheral surface and said outer tube having an inner peripheral face, said outer peripheral surface and said inner peripheral face defining a space therebetween at one end of said socket;

a plug having a fluid passage, a second valve assembly and a main plug tube body insertable in said one end of said socket between said inner tube and said outer tube;

push means for causing said valves of said socket and said plug to push each other and said fluid passages of said socket and said plug to communicate with each other, when said plug is connected to said socket; and seal means provided on said outer peripheral surface of said inner tube, for sealing a gap defined by said inner tube and said plug, said seal means having Y-shaped packing located near the inner end portion of the said inner tube and an O-ring located adjacent said Y-shaped packing, said Y-shaped packing having a base portion, and prong-portion facing said one end of said socket;

each of said first and second valve assemblies including a valve body having a valve head portion and a valve rod portion threadably engaging each other and a seal ring inserted between said valve head portion and said valve rod portion, each of said valve head and valve rod portions having a through hole for assembling each of said first and second valve assemblies.

2. The tube coupler according to claim 1, wherein one of said plug and said socket has a valve seat, and said seal ring is adapted to abut against said valve seat to close said fluid passages.

3. The tube coupler according to claim 2, wherein each of said valves has a valve spring for urging said seal ring to cause said seal ring to abut against said valve seat.

4. The tube coupler according to claim 1, wherein said push means comprises a valve pushing rod extending forward from each of said valve head portions of said plug and socket and abutting against the corresponding valve pushing rod to open the corresponding fluid passage.

* * * * *